Figure 1:
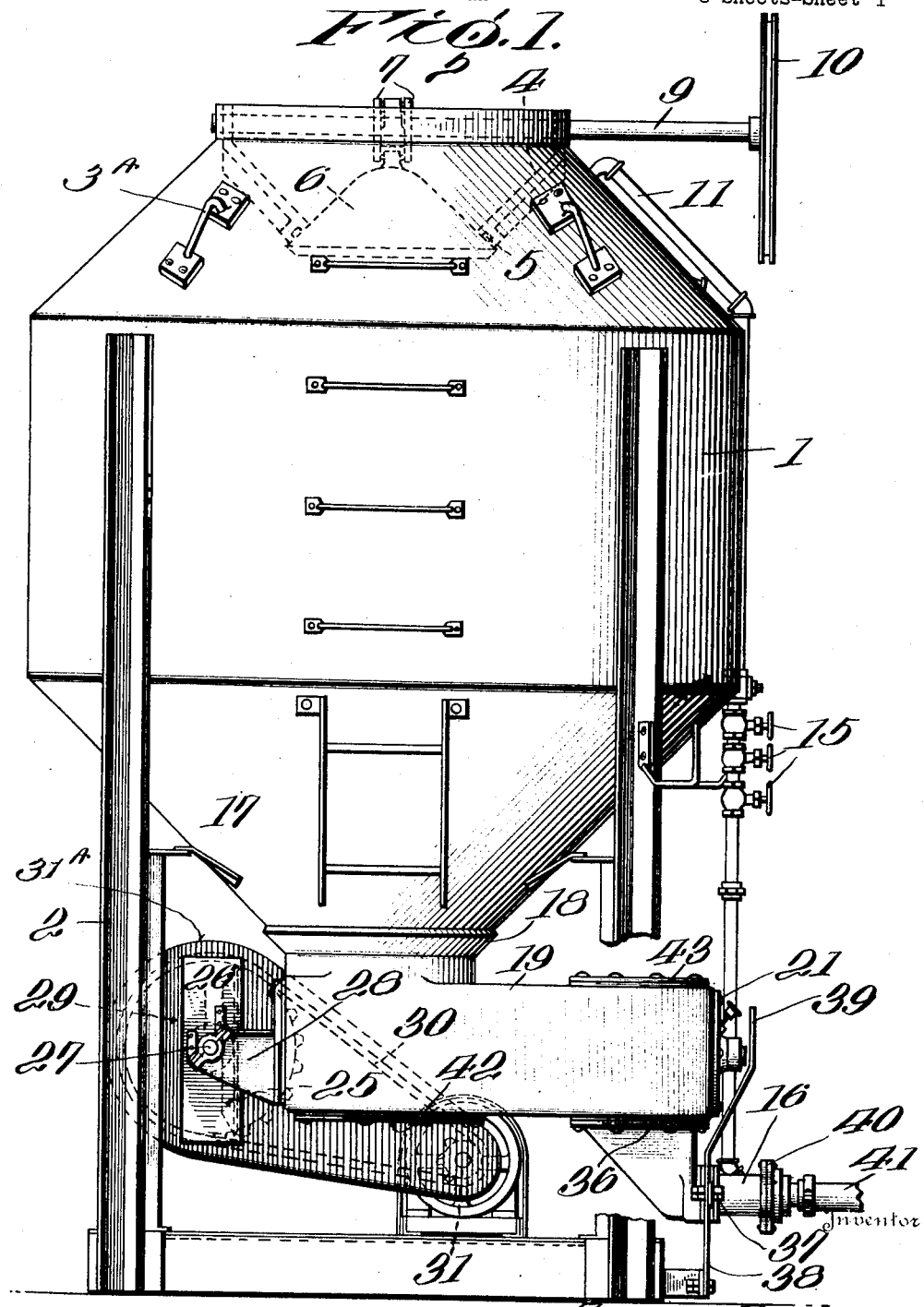

Nov. 16, 1926.

A. P. MEYER 1,607,554

PROCESS OF AND APPARATUS FOR LINING FURNACES

Filed Jan. 18, 1924   6 Sheets-Sheet 1

Nov. 16, 1926.

A. P. MEYER 1,607,554

PROCESS OF AND APPARATUS FOR LINING FURNACES

Filed Jan. 18, 1924    6 Sheets-Sheet 3

Inventor
ALBERT P. MEYER.

By K P McElroy
Attorney

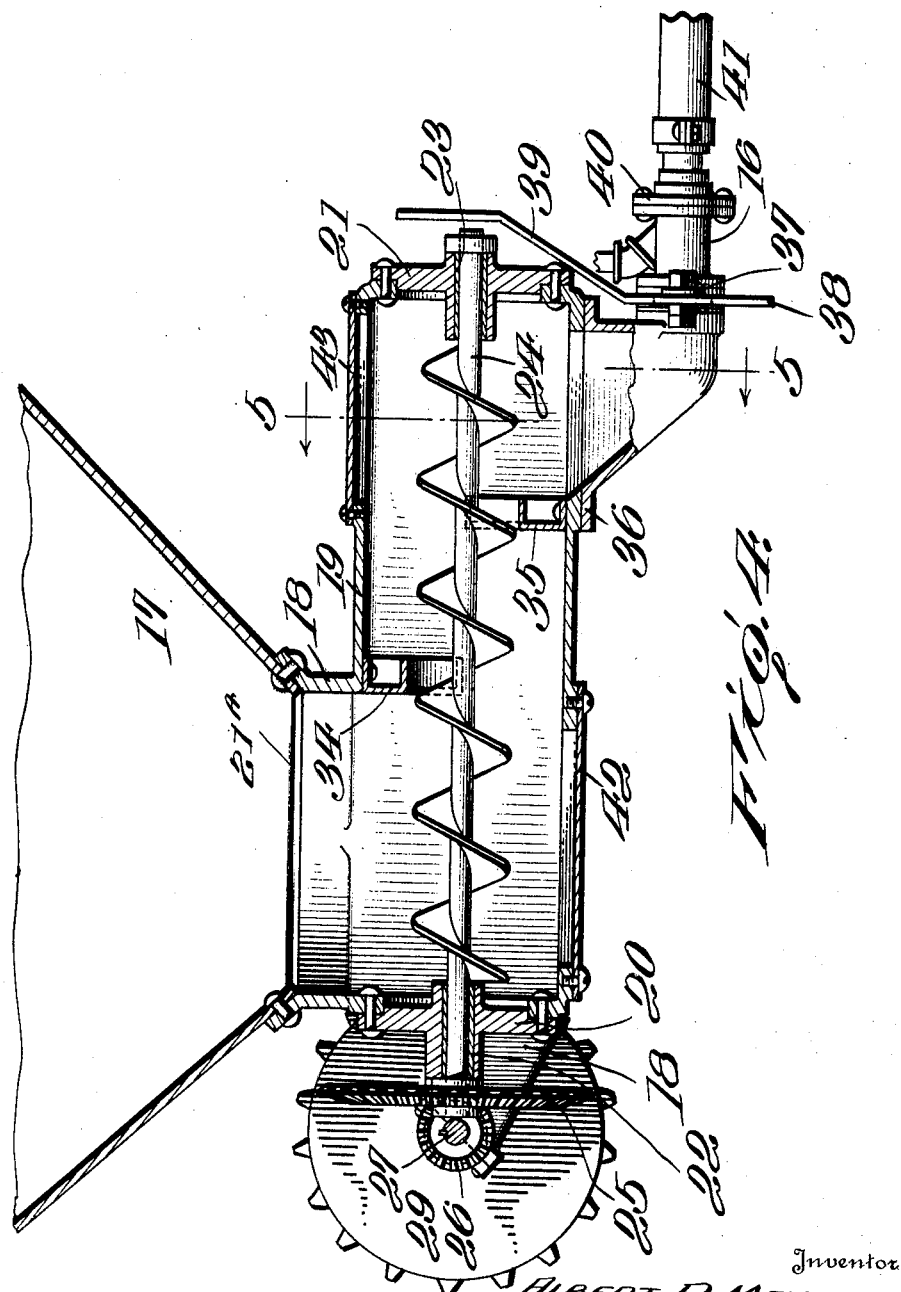

Nov. 16, 1926.  1,607,554
A. P. MEYER
PROCESS OF AND APPARATUS FOR LINING FURNACES
Filed Jan. 18, 1924    6 Sheets-Sheet 5
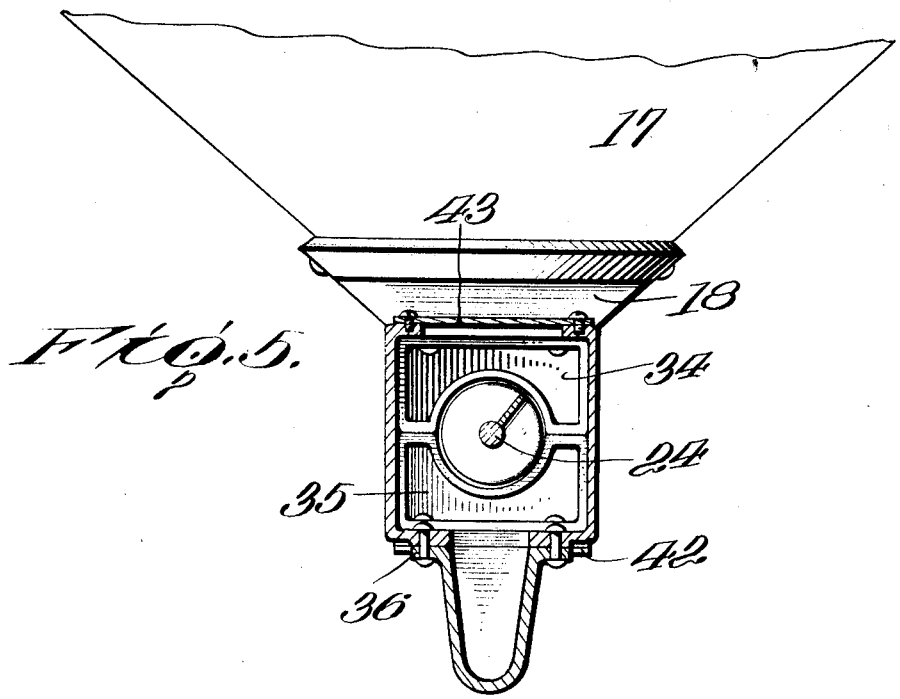
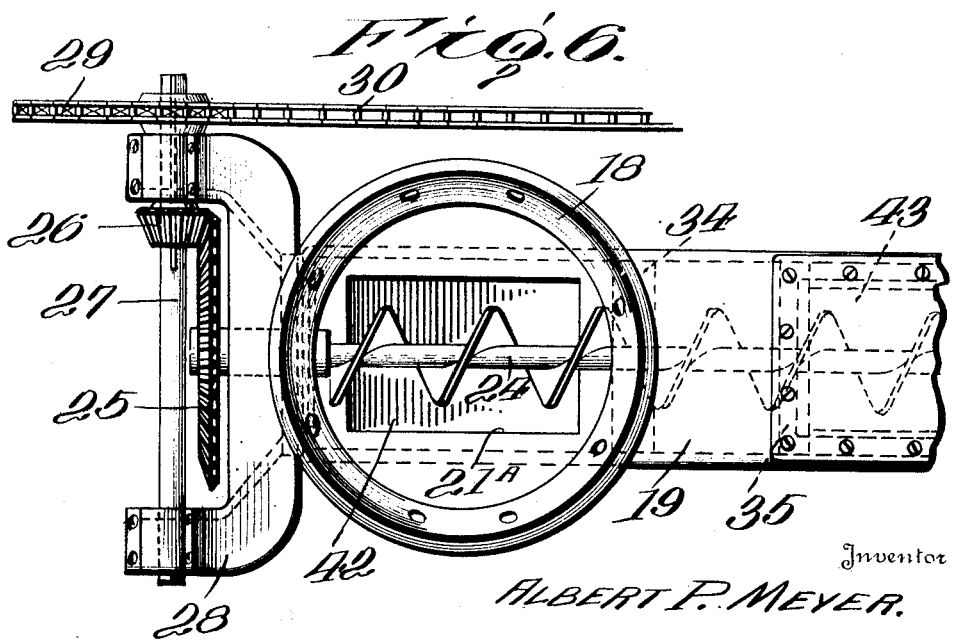
Inventor
ALBERT P. MEYER.
By K. P. McElroy
Attorney

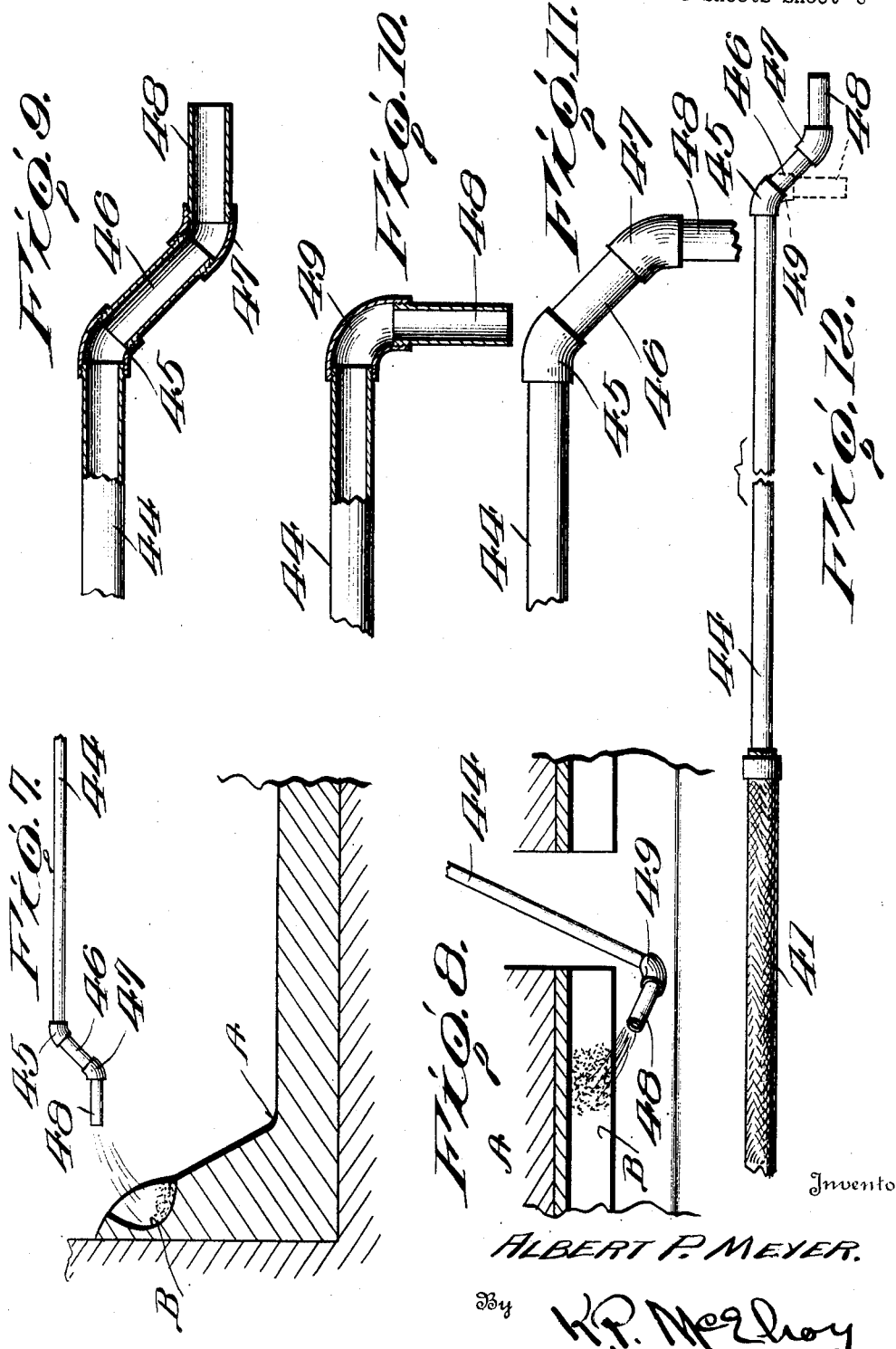

Patented Nov. 16, 1926.

1,607,554

UNITED STATES PATENT OFFICE.

ALBERT P. MEYER, OF PITTSBURGH, PENNSYLVANIA, ASSIGNOR TO ALLEN S. DAVISON COMPANY, OF PITTSBURGH, PENNSYLVANIA, A CORPORATION OF PENNSYLVANIA.

PROCESS OF AND APPARATUS FOR LINING FURNACES.

Application filed January 18, 1924. Serial No. 687,153.

This invention relates to processes of and apparatus for lining furnaces; and it comprises a method of lining, patching and repairing granular bed furnaces of the open hearth type wherein granular lining material is transported in a suitable closed conduit to a point near the point of application by a current of air and prior to ejection of the material from the end of the conduit is impeded in its passage in such a manner that it does not accumulate high velocity; and it further comprises means for delivering air under pressure and granular material through a conduit and means associated with the conduit for impeding the travel of the material therethrough without choking the conduit; all as more fully hereinafter set forth and as claimed.

Open hearth furnaces are usually provided with a basin-shaped bed of granular material, the granules being sintered or bonded together under the heat of the furnace to form a coherent whole. At the sides there is a bank extending up above the normal slag line. Bottom and bank are usually referred to as the lining. With basic open hearth furnaces, the lining is usually some form of material derived from dolomite; and it comes in the form of small, hard, heavy granules. In acid open hearth furnaces acid materials are used. A certain amount of repairing to the lining must be done after each heat. Sometimes the bottom needs repairs where holes or thin places have developed; more frequently the banked sides need repair and particularly near the slag line. In ordinary practice, these repairs are effected by a gang of men, each of whom takes his turn in pitching a shovelful of material to and on the spot to be repaired. The heat at the open door of the furnaces is very high and the exertion involved in throwing the material across the furnace is great, so that a gang of men is used. Much skill is also required to make a shovelful land at exactly the place it is required. Any granules that fall or rebound to the floor of the furnace are not only wasted but raise its level. Many propositions have been made for using mechanical devices of one kind or another for economizing labor and material, but none has proved successful. Moving mechanism is not practicable in the hot furnace and air and steam projection have proved unsuccessful for reasons inherent in the material.

This material weighs 115 lbs. per cu. ft. and while it can be moved through a pipe or conduit by air, it tends to segregate and travel preferentially along the lower section of the pipe. Lining operations require a large volume of material delivered per second and any obstruction, constriction or restriction in the pipe causes plugging and stops the flow. And if an effort be made to increase the flow by high air pressure, projection becomes too violent; the material emerges with too high a velocity; it is shot out, so to speak. This is not desired. With any violence of projection, the amount which will rebound and roll down the bank becomes great.

I have discovered that by certain expedients it is possible to impede and thereby control the nozzle velocity of such granular material as is used for lining open hearth furnaces, so that it can be directed and delivered to the point of application in the furnace without any substantial rebound, while at the same time conveying it through a conduit with sufficient air under sufficient pressure to carry it entirely therethrough. The conditions for such delivery through the conduit and to the point of application are in a sense contradictory. The material is not only heavy but it is necessary that large quantities of it be delivered in a relatively short time. To carry such heavy material through a conduit in large amounts requires considerable amounts of air, but the required air under the necessary force would result in delivering the material, for instance, from a straight pipe with an excessive velocity. In open hearth practice, the velocity of ejection must be relatively low.

One particularly advantageous way of impeding the passage of material through the conduit consists in the use of an elbow or elbows near the end of the conduit. In one test a sealed tank containing the granular material was supplied with air under about 25 pounds pressure and to this tank was connected a hose 40 feet long. To the end of this hose was attached a 20-foot length of 2-inch pipe. Between the hose and the tank, mechanical means were provided for overcoming the inertia of granular material and arrangements were made for allowing the air from the tank to pass through these means and to the hose. Under such conditions, with 25 pounds of pressure in the tank and with the use of 20 feet of 2-inch pipe and a 6-foot length of 2-inch pipe as a nozzle, held parallel to the floor, 3 feet thereabove, the point of impact from the end of the nozzle was found to be 28 feet, measured along the floor. The muzzle velocity of the granular material was calculated to be about 65 feet per second, neglecting air resistance negligible at such velocity.

In another test, to the 6-foot nozzle a 45° elbow was attached and to this elbow there was attached a 6-inch nipple and to the end of this 6-inch nipple there was attached another 45° elbow and to this elbow, a 6-inch nipple was attached. With this arrangement and with the point of ejectment maintained 3 feet above the floor level, with the same pressure in the tank and under the same conditions as the first test, the horizontal distance to the point of impact with the floor was found to be 8 feet. The nozzle velocity, computed in the same manner as in the first test, was found to be 18 feet per second. The flow of material through the pipe was ready and large volumes could be readily delivered at low velocity. No plugging occurred.

The decrease in velocity after attaching the two 45° elbows is due to the loss of energy caused by the abrupt change of direction of flow. This sudden change in direction of flow results in the layers of material overtopping one another, thus causing a breaking up of the stream or streams and an eddying action which rapidly dissipates the energy of the stream by frictional resistance, but does not lessen the volume of air.

In the two tests to which reference has been made, two Pittsburgh mercury gages were mounted, one at 6 inches from each end of the 6-foot nozzle. During the first test, when the 20-foot length of pipe and the 6-inch nozzle were used and when there was 25 pounds air pressure in the tank, the pressure 6 inches from the end of the nozzle was 3 ounces, while the pressure indicated by the other gage 5 feet 6 inches from the end of the nozzle was 1.5 pounds or 24 ounces. In the second test, where two 45° elbows with the 6-inch nipple between them and a 6-inch nipple on the end were used (making the end of the nozzle approximately 18 inches from the first gage connection) and with 25 pounds of air in the tank, the pressure at the extreme gage, or about 18 inches from the end, was about 1.5 pounds, or 24 ounces; while the pressure 5 feet further back, or at the second gage (6.5 feet back from the end of the nozzle) was 3 pounds, or 48 ounces.

From these tests it is evident that by changing the line of direction of flow of the material, the pressure was backed up. When using the two 45° elbows, the flow of the material was impeded and the result was that pressure at a point back of the elbows was utilized in moving this material past the impediment, so that the energy of the air was absorbed and the nozzle velocity of the material was diminished over what it would be if the impediment were not present.

When a 90° elbow was used on the end of the 6-inch nozzle, the velocity of the material was slowed down to a perceptible degree, under 8 feet per second and under the same conditions.

By the use of the two 45° elbows or the 90° elbow, the velocity of the material going through the conduit can be lowered over what it would be in a straight pipe (given the same air pressure and the same amount of material) without clogging the pipe or, expressed in another way, without reducing the pressure in the pipe to such a point that the volume of air will fail to eject the material.

My invention also comprises certain improvements in granular material delivery means and in processes of delivering granular material, set forth in the following description and particularly pointed out in the claims.

In the accompanying drawings I have shown one form of a specific embodiment of my invention and illustrating means for carrying out my process.

Figure 2:
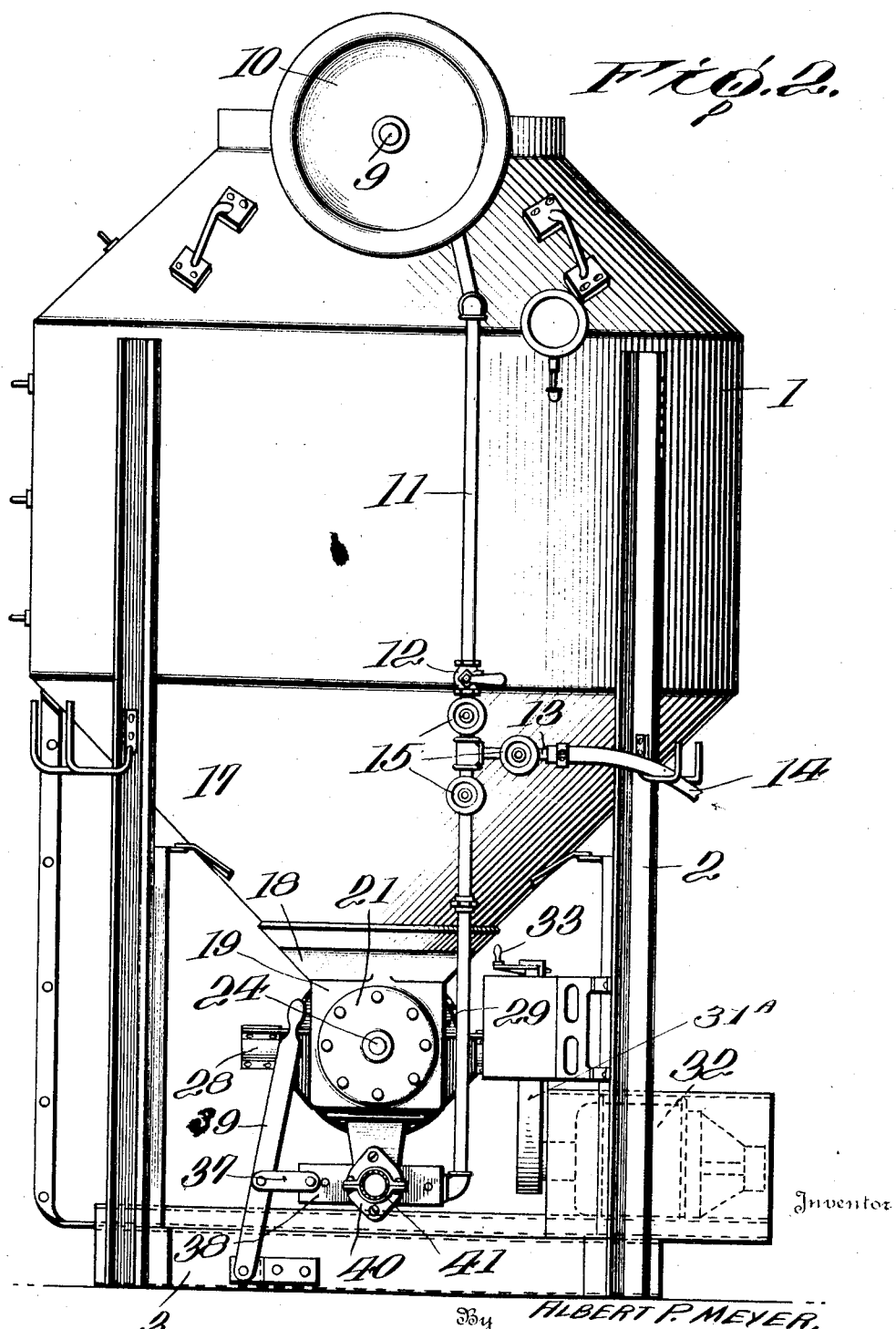
Figure 3:
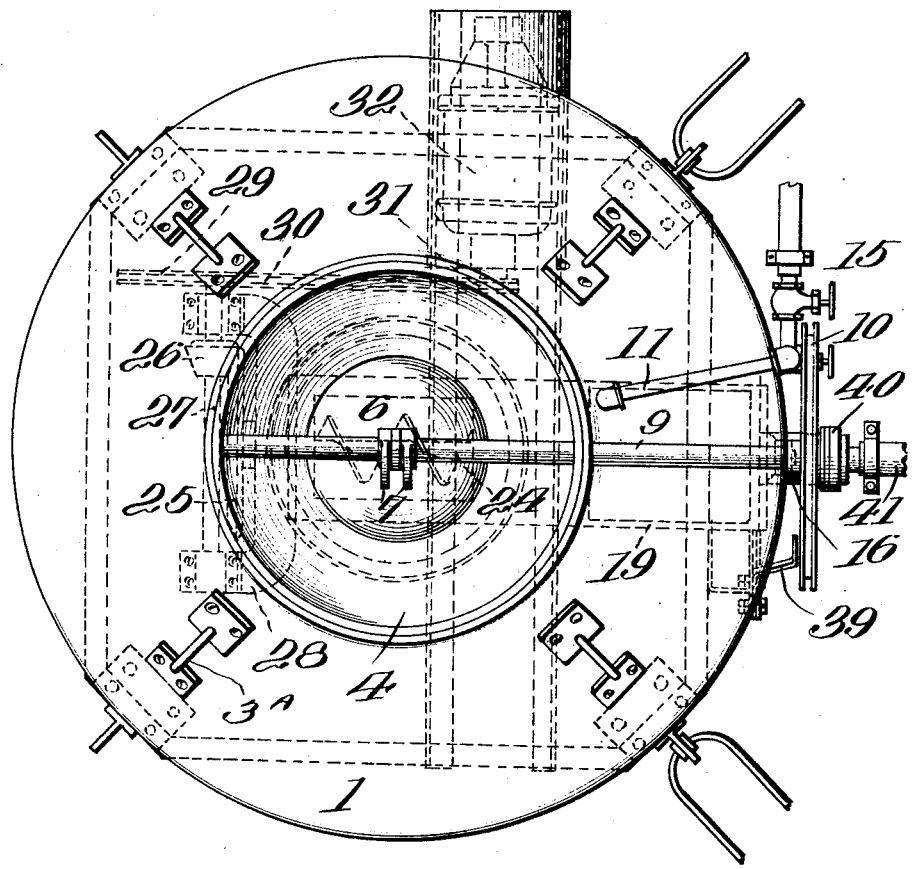

Fig. 1 is a side elevation;
Fig. 2 is a front elevation;
Fig. 3 is a top plan view;
Fig. 4 is a longitudinal section on an enlarged scale through the conveyor and lower portion of the tank;
Fig. 5 is a section along line 5—5 of Fig. 4;
Fig. 6 is a top plan view looking in the conveyor box, the tank removed;
Fig. 7 is a segmental vertical section through an open hearth furnace showing the nozzle delivering granular material at the slag line;
Fig. 8 is a horizontal section through the furnace taken just above the slag line and illustrates the manner of repairing the front walls;
Fig. 9 is a segmental sectional view of the end of the nozzle carrying two 45° elbows;
Fig. 10 is a similar view of the nozzle carrying a 90° elbow;
Fig. 11 is a side elevation of the end of the nozzle with one 45° elbow in different position; and
Fig. 12 is a segmental perspective view of the hose and nozzle.

Referring to the drawings, 1 indicates a sealed tank preferably made of steel and supported by means of the angle irons 2 from the base 3 of the machine. At the top the machine is provided with hooks 3ᴬ for use in conveying the apparatus by means of a crane into proximity to the furnace to be lined. The tank is provided at the top with the hopper 4 having packing 5 at its lower end and normally closed by the bell 6 mounted on the bell crank lever 7 operated by shaft 9 and pulley 10. The construction of the bell and hopper forms no part of the present invention but is typical of the kind which may be used. Near the top the tank is provided with inlet pipe 11 having a release valve for releasing air from the tank and having the branch 13 which is coupled with hose 14 leading to a source of air under pressure or to a compressor. Lines 11 and 13 are provided with valves 15. The line 11 extends to the nipple 16 leading from the conveyor box to be described.

The lower part 17 of the tank is conical in shape and is open at the bottom. It is in sealed communication with the mouth 18 of the conveyor box 19 so that solid material is delivered into the conveyor box on top of the conveyor through opening 21ᴬ.

The conveyor box is provided with the ends 20 and 21 having bearings 22 and 23, respectively, for the ends of the conveyor shaft 24. The end of the shaft passing through bearing 22 is provided with beveled gear 25 which meshes with driving pinion 26 keyed to shaft 27 having bearings at either end in the yoke 28 and having keyed to one end the gear 29 driven by chain 30. The chain 30 is driven by sprocket 31 on the shaft of the motor 32. The motor may be controlled by the usual box and controller handle 33, and the chain gear and sprocket may be covered by the casing 31ᴬ.

The conveyor box is provided inside with downwardly extending baffle plate 34 and upwardly extending baffle plate 35: these plates being so arranged that they form guards, so to speak, and limit the amount of material which is carried forward by the conveyor, at the same time preventing passage of air except along the line of the conveyor. This gives an even flow of material and prevents choking.

Attached to the lower front end of the conveyor is the nozzle head 36 to which material admixed with air is forced by the conveyor and coupled to this at its lower end is connection 37 carrying the gate valve 38 controlled by handle 39. Attached to the connection 37 is the short nipple 16 into which the lower end of the pipe 11 fits. It is advantageous to arrange the lower end of the pipe 11 through the elbow and nipple shown to direct the air under pressure in forward direction. The hose coupling 40 for hose 41 is attached to the nipple 16.

For the purpose of cleaning, the lower end of the conveyor is provided with the removable plate 42 and for purposes of inspection, repair and cleaning, the front end is provided with upper removable plate 43.

In Fig. 7, A represents the open hearth furnace and B represents the slag pocket which is to be repaired. The nozzle 44 is provided with the elbow 45, the 6-inch nipple 46, the elbow 47 and the short nipple 48. This combination with about 25 pounds of air pressure in the tank delivers the granular material at the correct velocity so that it may be deposited in place without any substantial rebound.

In Fig. 8 is shown a way of lining the front walls of the furnace near the door. For this purpose, it is convenient to use the 90° elbow 49. With the use of this elbow the material may be delivered at less velocity than with the use of the two 45° elbows, given the same air pressure and rate of feed of granular material.

In Fig. 11 is shown a combination of 45° elbows giving a right angle turn. This combination of elbows may be used for lining the front walls of the furnace when it is desired to have a velocity corresponding to the velocity resulting in the use of the combination shown in Fig. 9.

In operation, the tank is filled substantially full of the granular material to be used for lining the furnaces and the machine is then carried by crane into proximity of the furnace to be lined. Air under pressure, say, 25 to 35 pounds, is admitted to the tank through line 11 to supply the necessary amount of air and the motor 35 is started through manipulation of controller handle 33. This turns the conveyor which feeds the granular material forwardly. The air may be continuously fed to the tank to keep up the supply. The air under the pressure prevailing in the tank assists in feeding the material forwardly. This conveyor acts to overcome the inertia of the material and to direct it to the nozzle head 36 and to a degree serves to control the rate of feed of the granular material. The gate valve 38 is open at this time, whereupon the material is fed, more or less in the nature of an emulsion of granular material and air, to the hose 41 and through the nozzle 44, there being sufficient volume of air for this purpose. The door of the open hearth furnace being opened, the nozzle is directed in the furnace and the granular material is directed against the slag line with a muzzle velocity sufficient to carry it to the point of application without any material rebound, under 65 feet per second and as low as 18 feet per second or less. If there is excess pressure in the tank 1, some air may be bled out through relief valve 12. The gate valve 38 is used for holding the air under pressure in the tank when the machine is not operating. At times, there may be an excessive feed of material past the gate valve 38, or occasion may arise for stepping up of the pressure in the hose 41. It is also occasionally necessary to clean out this hose after the gate 38 is closed and for these reasons, pipe 11 is extended to the nipple 16. Upon proper operation of the valves on the line 11, auxiliary air may be sent to the hose 41 either from the main line or from the tank.

In actual practice, I have found that a muzzle velocity of about 18 feet per second is useful for repairing the slag line of the furnace, and particularly the back walls; while even a somewhat less velocity is useful for repairing the slag line at the front walls. However, I do not limit my invention to the use of these particular muzzle velocities, since I have used muzzle velocity slightly under 50 feet per second (particularly for patching or lining the back of the furnace) and as low as 5 feet per second (for the front walls). The successful velocity is that which will deliver the material to the point of application without substantial rebound and, of course, this depends upon the distance the muzzle is held from such point. I ordinarily endeavor to hold the muzzle above and within two feet of the slag line at the rear walls and below and within six to eight inches of the slag line for the front walls. And I ordinarily use a relatively short section of pipe or nipple at the extreme end of the nozzle to prevent too great a spread of the material, although I have dispensed with this short section of pipe with very good results.

In providing impedance to "back up" pressure in the pipe, care must be taken not to do this to any degree which will choke the pipe so that it will fail to eject at all. If the air present is relieved at a distance back of the muzzle, care must be taken to do this in such a way as to allow sufficient air pressure to remain to carry the material to the muzzle and eject it therethrough.

While I do not wish to confine myself to any theory as to the behavior of the granular material in the pipe due to placing impedance in the line near the delivery end, the facts being as noted, nevertheless, it may be that the heavy material and the air in traveling along the conduit tend to segregate, more or less, with a concentration of the solid material toward the base of the conduit. If the pipe be open and unrestricted, this segregation persists at the muzzle; the air and the material maintain their segregation, more or less, as they escape. The material travels in a straight line and is projected forward. If, however, just prior to allowing the air and the material to escape, they be subjected to a mixing and swirling action, such as is caused by the stated impedance, they emerge as a well mixed jet which maintains its identity for a sufficient length of time for the present purposes. Whatever the behavior of the material in the conduit, by the use of the impedance I can project the material to the point where it is wanted, whether this be on the back wall or the front wall or the bottom of the furnace, and deposit it there with the correct velocity, so there is no substantial rebounding or rolling.

With the use of one man controlling the machine and one or two men directing the nozzle, I have been able to completely line a 60-foot furnace in 10 to 15 minutes and have delivered 1,500 to 4,500 pounds of granular material in 15 to 20 minutes.

The illustration of my process is typical. The air pressures maintained in the tank may vary, the length and diameter of the hose and the nozzles may be changed, the rate of delivery of the material may be controlled by the conveyor, and the conditions of operation may be altered as the exigencies of any particular situation may demand. Provision is made so the process and apparatus may be readily adapted for any particular furnace plant. The nozzle may be bent in any way to give the correct impedance to the flow of the material, instead of using the elbows shown, and, as stated, the rate of feed of the material may be governed by the conveyor to a degree. The muzzle velocity of the material may be controlled by the speed of the conveyor. Other fluids than air may be used, but I have found the use of air under pressure is economical and convenient and it has the advantage that it acts as a cooling agent for the nozzle.

What I claim is:—

1. The process of delivering lining material to open hearth furnaces which comprises delivering air and granular lining material to a point in proximity to the wall to be lined in an unrestricted flow through a tubular conduit in a substantially straight line and just prior to emergence of the lining material from the end of the conduit abruptly changing its line of travel.

2. The process of delivering lining material to open hearth furnaces which comprises delivering air and granular lining material to a point in proximity to the wall to be lined through a tubular conduit in a substantially straight line and just prior to ejection of the lining material impeding the flow in such a manner that it does not accumulate the velocity which the air is capable of giving it were its path unimpeded.

3. The process of delivering lining material to open hearth furnaces which comprises supplying granular material to a conduit extending into proximity to the wall to be lined together with air under sufficient pressure to carry the material therethrough, and impeding the travel of the material near the end of the conduit to back up the air pressure so that the air near the end of the conduit must overcome the resistance due to such impedence and thus eject the material at a low velocity.

4. The process of lining open hearth furnaces which comprises directing a conduit into proximity to the point of application of the lining material, supplying lining material to such conduit by means of fluid under pressure and so impeding its flow that it will have a muzzle velocity not over 50 feet per second or under 5 feet per second to thereby permit accurate placement of the lining material but substantially prevent spattering thereof.

5. The process of lining open hearth furnaces which comprises directing a nozzle into proximity to the point of application of the lining material, supplying lining material to such nozzle by means of fluid under pressure and so impeding its flow that it will have a muzzle velocity for the back walls of the furnace of about 18 feet per second and for the front walls a muzzle velocity of less than 18 feet per second to thereby permit accurate placement of the lining material but substantially prevent spattering thereof.

6. The process of lining open hearth furnaces with granular material which comprises directing a conduit into proximity to the point of application of such material, positioning the end of the conduit at an elevation slightly above the point of application of such material to the back walls of a furnace, and impeding the flow of material prior to its emergence from the conduit to obtain a muzzle velocity under 50 feet per second and for the front walls of such furnace at a point slightly below the point of application of such material with a muzzle velocity under 18 feet per second.

7. The process of lining and repairing open hearth furnaces which comprises delivering lining material by air through a tubular conduit terminating in proximity to the points of application of the material with that velocity necessary to convey it and impeding the flow of the material at the point of discharge from the conduit to such velocity as to permit its being placed at the point of application without substantial rebound.

8. Apparatus for delivering heavy granular material in the relining of furnace walls comprising a sealed tank, a sealed mechanical conveyor associated therewith, a conduit associated with the said conveyor, means for operating the conveyor, means for admitting air under pressure to said tank, and means on the conduit adjacent its delivery end for reducing the muzzle velocity thereof.

9. The process of delivering granular lining material to open hearth furnaces which comprises maintaining a bulk supply of such material in communication with a conduit, inserting the conduit into the furnace with its end in proximity to the point of application of such material, feeding the material through the conduit by fluid under pressure and reducing the velocity of flow of the material just prior to its emergence from the end of the conduit without interfering wth its continuous passage therethrough.

10. The process of delivering granular lining material to open hearth furnaces which comprises establishing and maintaining a bulk supply of such material in communication with a conduit, inserting the conduit in the furnace with its end relatively close to the point of application of the material, delivering such material by means of fluid under pressure in a substantially unobstructed path and in a stream defined by the conduit, and just prior to the emergence of the material from the end of the conduit impeding its progress to an extent allowing its application without substantial rebound and without interfering with continuous passage of material through the conduit.

In testimony whereof, I have hereunto affixed my signature.

ALBERT P. MEYER.